(12) United States Patent  (10) Patent No.: US 7,506,271 B2
Wang et al.  (45) Date of Patent: Mar. 17, 2009

(54) MULTI-MODAL HANDWRITING RECOGNITION CORRECTION

(75) Inventors: Jian Wang, Beijing (CN); Jian-Lai Zhou, Beijing (CN); Jiang Wu, Beijing (CN); Hongyun Yang, Beijing (CN); Xianfang Wang, Beijing (CN); Wenli Zhu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 663 days.

(21) Appl. No.: 10/734,305

(22) Filed: Dec. 15, 2003

(65) Prior Publication Data

US 2005/0128181 A1 Jun. 16, 2005

(51) Int. Cl.
*G06F 3/048* (2006.01)
(52) U.S. Cl. ...................................................... 715/809
(58) Field of Classification Search ................ 715/809
See application file for complete search history.

(56) References Cited

U.S. PATENT DOCUMENTS

| | | |
|---|---|---|
| 4,829,576 A | 5/1989 | Porter |
| 4,866,778 A | 9/1989 | Baker |
| 5,331,431 A | 7/1994 | Jasinski et al. |
| 5,406,480 A | 4/1995 | Kanno |
| 5,502,774 A | 3/1996 | Bellegarda et al. |
| 5,513,278 A | 4/1996 | Hashizume et al. |
| 5,517,578 A | 5/1996 | Altman et al. |
| 5,550,930 A | 8/1996 | Berman et al. |
| 5,583,543 A | 12/1996 | Takahashi et al. |
| 5,590,257 A | 12/1996 | Forcier |
| 5,596,694 A | 1/1997 | Capps |
| 5,615,378 A | 3/1997 | Nishino et al. |
| 5,649,027 A | 7/1997 | Mahajan et al. |

(Continued)

FOREIGN PATENT DOCUMENTS

EP 1 363 232 A2 11/2003

(Continued)

OTHER PUBLICATIONS

"Pen and voice unite" Crane H., Rtischev D. Byte 18(11): 98-102, 1993.*

(Continued)

*Primary Examiner*—Stephen Hong
*Assistant Examiner*—Samir Termanini
(74) *Attorney, Agent, or Firm*—Birch, Stewart, Kolasch & Birch, LLP

(57) ABSTRACT

Systems, methods, and computer-readable media for processing electronic ink receive an electronic ink input; convert the electronic ink input to a first machine-generated object using handwriting recognition; display the first machine-generated object on a display; receive speech input; convert the speech input to a second machine-generated object using speech recognition; generate a list of machine-generated objects based on the electronic ink input, the list including the first machine-generated object and alternative machine-generated objects and functioning as a dictionary for converting the speech input; and replace the first machine-generated object with the second machine-generated object. A user may confirm that the second machine-generated object should replace the first machine-generated object. The systems and methods may generate a list of alternative machine-generated object candidates to the first machine-generated object based on handwriting recognition of the electronic ink input alone or in combination with a statistical language model.

48 Claims, 9 Drawing Sheets

U.S. PATENT DOCUMENTS

| | | | |
|---|---|---|---|
| 5,659,771 | A | 8/1997 | Golding |
| 5,666,139 | A | 9/1997 | Thielens et al. |
| 5,682,439 | A | 10/1997 | Beernink et al. |
| 5,710,916 | A | 1/1998 | Barbara et al. |
| 5,715,469 | A | 2/1998 | Arning |
| 5,717,939 | A | 2/1998 | Bricklin et al. |
| 5,764,799 | A | 6/1998 | Hong et al. |
| 5,787,455 | A | 7/1998 | Seybold |
| 5,802,388 | A | 9/1998 | Zetts et al. |
| 5,812,697 | A | 9/1998 | Sakai et al. |
| 5,841,901 | A | 11/1998 | Arai et al. |
| 5,850,480 | A | 12/1998 | Scanlon |
| 5,855,000 | A | 12/1998 | Waibel et al. |
| 5,870,702 | A | 2/1999 | Yamabana |
| 5,883,986 | A | 3/1999 | Kopec et al. |
| 5,907,839 | A | 5/1999 | Roth |
| 5,956,739 | A | 9/1999 | Golding et al. |
| 5,960,447 | A | 9/1999 | Holt et al. |
| 5,966,464 | A | 10/1999 | Kojima |
| 6,005,973 | A | 12/1999 | Seybold et al. |
| 6,014,460 | A | 1/2000 | Fukushima et al. |
| 6,052,482 | A | 4/2000 | Arai et al. |
| 6,055,333 | A | 4/2000 | Guzik et al. |
| 6,108,445 | A | 8/2000 | Uehara |
| 6,111,985 | A | 8/2000 | Hullender et al. |
| 6,154,579 | A | 11/2000 | Goldberg |
| 6,167,376 | A * | 12/2000 | Ditzik ........................ 704/235 |
| 6,185,333 | B1 | 2/2001 | Arai et al. |
| 6,205,261 | B1 | 3/2001 | Goldberg |
| 6,285,785 | B1 | 9/2001 | Bellegarda et al. |
| 6,337,698 | B1 | 1/2002 | Keely, Jr. et al. |
| 6,340,967 | B1 | 1/2002 | Maxted |
| 6,424,743 | B1 | 7/2002 | Ebrahimi |
| 6,438,523 | B1 | 8/2002 | Obertcuffer et al. |
| 6,473,517 | B1 | 10/2002 | Tyan et al. |
| 6,513,005 | B1 | 1/2003 | Qin et al. |
| 6,583,798 | B1 | 6/2003 | Hoek et al. |
| 6,618,697 | B1 | 9/2003 | Kantrowitz et al. |
| 6,701,023 | B1 | 3/2004 | Gaither et al. |
| 6,735,341 | B1 | 5/2004 | Horie et al. |
| 6,782,510 | B1 | 8/2004 | Gross et al. |
| 6,788,815 | B2 | 9/2004 | Lui et al. |
| 6,847,734 | B2 | 1/2005 | Hamamura |
| 6,904,405 | B2 | 6/2005 | Suominen |
| 6,912,498 | B2 | 6/2005 | Stevens et al. |
| 2002/0180689 | A1 | 12/2002 | Venolia |
| 2002/0194223 | A1 | 12/2002 | Meyers et al. |
| 2003/0007018 | A1 | 1/2003 | Seni et al. |
| 2003/0014252 | A1 | 1/2003 | Shizuka et al. |
| 2003/0016873 | A1 | 1/2003 | Nagel et al. |
| 2003/0055655 | A1 * | 3/2003 | Suominen ................... 704/276 |
| 2003/0189603 | A1 | 10/2003 | Goyal et al. |
| 2003/0212961 | A1 | 11/2003 | Soin et al. |
| 2003/0233237 | A1 | 12/2003 | Garside et al. |
| 2004/0021700 | A1 | 2/2004 | Iwema et al. |
| 2004/0119754 | A1 * | 6/2004 | Bangalore et al. ............ 345/809 |
| 2004/0122674 | A1 * | 6/2004 | Bangalore et al. ............ 704/276 |
| 2005/0135678 | A1 | 6/2005 | Wecker et al. |
| 2005/0171783 | A1 * | 8/2005 | Suominen .................... 704/276 |
| 2005/0183032 | A1 * | 8/2005 | Bushey et al. ................ 715/809 |

FOREIGN PATENT DOCUMENTS

| | | |
|---|---|---|
| EP | 1363229 A2 | 11/2003 |
| EP | 1365349 A2 | 11/2003 |
| JP | 63095590 | 4/1988 |
| JP | 04290184 | 10/1992 |

OTHER PUBLICATIONS

H. Bandoh et al., "User Interfaces for Correcting Errors in Writing-box-free Recognition of Handwritten Text," Transactions of the Information Processing Society of Japan, vol. 43, No. 6, Jun. 2002, pp. 1996-2005 (English Abstract only).

Z. Trabelsi et al., "A Voice and Ink XML Multimodal Architecture for Mobile e-Commerce Systems," WMC '02, Sep. 28, 2002, Atlanta, GA, pp. 110-104.

B. Suhm et al., "Multimodal Error Correction for Speech User Interfaces," ACM Trans Computer-Human Interaction, vol. 8, No. 1, Mar. 2001, pp. 60-98.

B. Suhm et al., "Model-Based and Empirical Evaluation of Multimodal Interactive Error Correction," CHI '99 Pittsburgh, PA, May 15-20, 1999, pp. 584-591.

K. Kukich, "Techniques for Automatically Correcting Words in Text," ACM Computing Surveys, vol. 24, No. 4, Dec. 1992, pp. 377-439.

M. Grasso et al., "The Integrality of Speech in Multimodal Interfaces," ACM Trans on Computer-Human Interaction, vol. 5, No. 4, Dec. 1998, pp. 303-325.

M. Baran, "Rough Gems: First Pen Systems Show Promise, Lack Refinement," Byte, Apr. 1992, pp. 212-222.

R. Zhao et al., "Pen-based Interfaces in Engineering Environments," Symbiosis of Human and Artifact, 1995, pp. 531-536.

C. Leedham, "Historical Perspectives of Handwriting Recognition Systems," The Institution of Electrical Engineers, 1994, pp. 1-3.

Bill Camarda, Using Microsoft Word 97, 1997, Que Corporation, pp. 54-55 and 199-200.

Wolfgang Hürst et al., "Error Repair in Human Handwriting—An Intelligent User Interface for Automatic On-Line Handwriting Recognition," IEEE Joint Symposia on Intelligence and Systems, pp. 389-395 (1998).

Ivan Poupyrev et al., "Virtual Notepad: Handwriting in Immersive VR," IEEE Virtual Reality Annual International Symposium, Mar. 14-18, 1998, pp. 126-132.

L. Schomaker, "From Handwriting Analysis to Pen-Computer Applications," Electronics and Communication Engineering Journal, vol. 10, No. 3, pp. 98-102 (1998).

OCR Master User's Guide, published by Microforum, 1997, pp. 3-6, 3-7, 3-14, 3-15, and 5-2-5-5.

Ward, Jean, et al., "An Annotated Bibliography in Pen Computing and Handwriting Character Recognition," 1992.

* cited by examiner

MULTI-MODAL HANDWRITING RECOGNITION CORRECTION

FIELD OF THE INVENTION

The present invention generally relates to systems, methods, and computer-readable media with computer-executable instructions stored thereon for processing electronic ink data in pen-based computing systems and/or other computing systems.

BACKGROUND

Typical computer systems, especially computer systems using graphical user interfaces (GUIs), are optimized for accepting user input from one or more discrete input devices, such as a keyboard for entering text, and a pointing device, such as a mouse with one or more buttons, for operating the user interface. An example of such a GUI is the user interface for the Windows® computer operating system (available from Microsoft Corporation of Redmond, Wash.). The ubiquitous keyboard and mouse interface provides for fast creation and modification of documents, spreadsheets, database fields, drawings, photos, and the like.

Recently, however, pen-based computing systems, such as tablet PCs and the like, have been increasing in popularity. In pen-based computing systems, user input advantageously may be introduced using an electronic "pen" or stylus (e.g., akin to writing with a pen or pencil on a piece of paper). Indeed, in at least some pen-based computing systems, all user input is capable of being entered and manipulated using an electronic pen input device, and the user interface is fully controllable using only the electronic pen.

As pen-based computing systems are becoming more popular, users are increasingly entering more data in the form of electronic ink. In pen-based systems such as the tablet PC, users can write on the tablet PC just like they would write on a piece of paper. In many instances, however, users wish to convert the original electronic ink data to machine-generated text, text suitable for use and manipulation by conventional word processing programs and other application programs. The tablet PC has handwriting recognition capabilities that convert handwriting to text. While the handwriting recognition in systems like the tablet PC is very good, it is not foolproof.

Accordingly, there is a need in the art to provide an efficient, reliable correction mechanism for allowing a user to correct handwriting recognition errors that result from the conversion of electronic ink to text. Such systems and methods would be particularly useful in pen-based computing systems and other devices that accept input in the form of electronic ink and/or from an electronic pen or stylus and/or systems or devices that display or otherwise process electronic ink data.

SUMMARY

Aspects of the present invention relate to systems and methods for processing electronic ink. Such systems and methods may include: (a) receiving electronic ink input (e.g., through an input device, such as a digitizer); (b) generating a list of machine-generated objects based on the electronic ink input, the list including a first machine-generated object and alternative machine-generated objects; (c) converting the electronic ink input to the first machine-generated object; (d) displaying the first machine-generated object; (e) receiving speech input; (f) converting the speech input to a second machine-generated object (e.g., using a speech recognition engine), wherein the second machine-generated object is one of the alternative machine-generated objects and the list of machine-generated objects functions as a dictionary used for converting the speech input; and (g) replacing the first machine-generated object with the second machine-generated object. The machine-generated objects may correspond to words, lines, and/or other groupings of machine-generated text.

In some aspects of the invention, a user may confirm that the second machine-generated object is correct; and the system will replace the first machine-generated object with the second machine-generated object. Systems and methods according to some aspects of the invention may display the list of alternative machine-generated object candidates to the first machine-generated object based on the electronic ink input. In one aspect, the list of alternative machine-generated object candidates includes object candidates generated by a handwriting recognition engine based on the electronic ink input and object candidates based on a statistical language model (e.g., unigram, bigram, trigram).

Additional aspects of the invention relate to computer-readable media including computer-executable instructions stored thereon for performing various methods and/or operating various systems, including systems and methods like those described above.

These and other novel advantages, details, embodiments, features and aspects of the present invention will be apparent to those skilled in the art from following the detailed description of the invention, the attached claims and accompanying drawings, listed herein, which are useful in explaining the invention.

BRIEF DESCRIPTION OF THE DRAWINGS

The above and other objects, features, and advantages of the present invention will be readily apparent and fully understood from the following detailed description, taken in connection with the appended drawings, in which.

DETAILED DESCRIPTION

Figure 1:
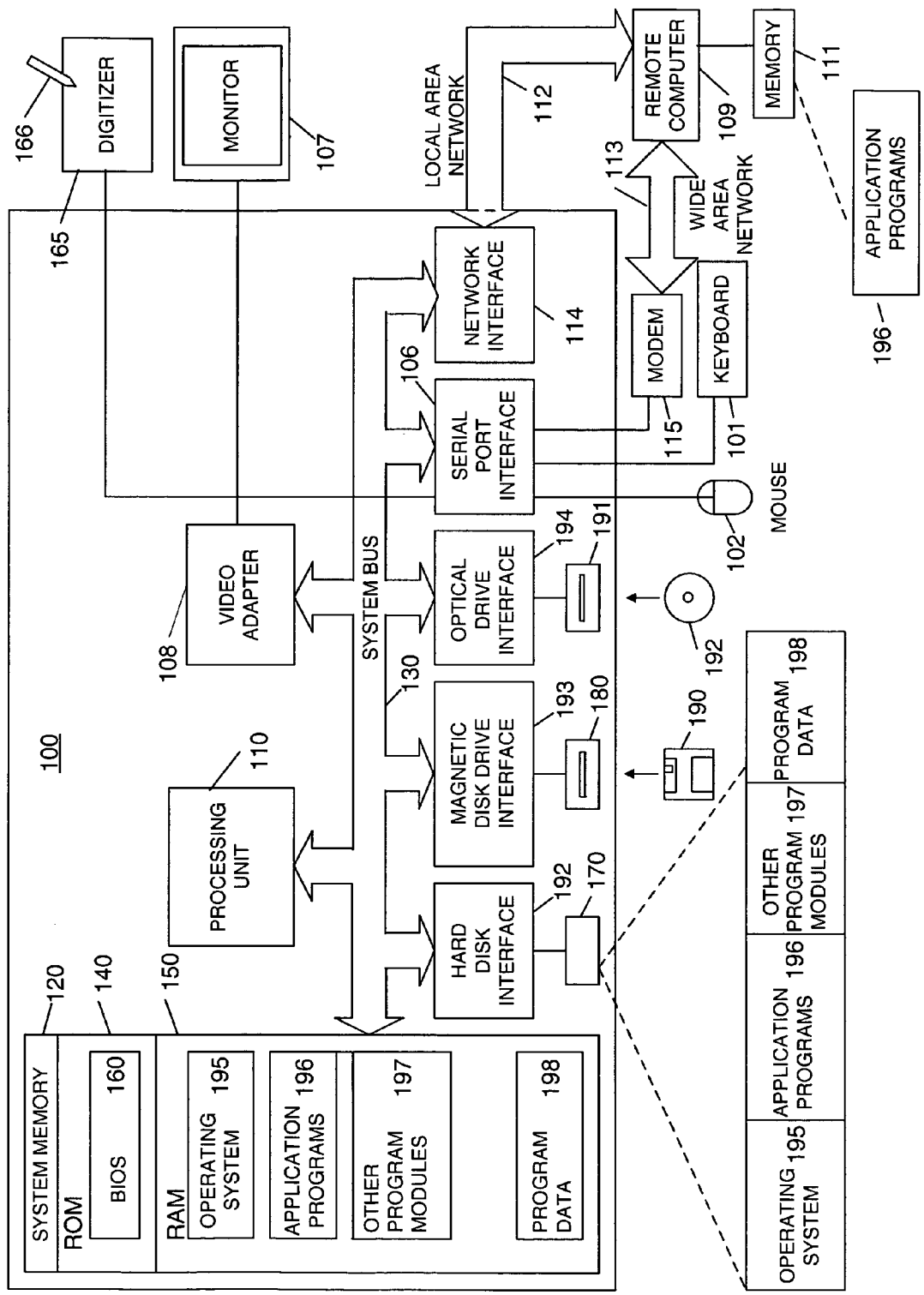
FIG. 1 illustrates a schematic diagram of a general-purpose digital computing environment in which certain aspects of the present invention may be implemented.

As described above, aspects of the present invention relate to systems, methods, and computer-readable media for processing electronic ink data. The following description is divided into sub-sections to assist the reader. The sub-sections include: Terms; General Description of Various Aspects of the Invention; Example Hardware; Example Systems, Methods, and Computer-Readable Media According to the Invention; and Conclusion.

I. Terms

The following terms are used in this specification and, unless otherwise specified or clear from the context, the terms have the meanings provided below:

"Pen"—Any type of user input device useful in entering ink into and/or otherwise manipulating or controlling an electronic document. The terms "pen" and "stylus" are used interchangeably in this specification.

"Pen-Down Event"—An event that is initiated at the time a pen contacts a digitizer. Typically, a pen-down event will end at the time the pen leaves the digitizer surface (also called a "pen-up event" in this specification).

"Computer-Readable Medium" means any available media that can be accessed by a user on a computer system. By way of example, and not limitation, "computer-readable media" may include computer storage media and communication media. "Computer storage media" includes volatile and nonvolatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. "Communication media" typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media."

II. General Description of Various Aspects of the Invention

Aspects of the present invention relate to systems and methods for processing electronic ink in pen-based computing systems and/or other computing systems that process, display, and/or otherwise handle electronic ink data. One aspect of the invention relates to use speech to correct handwriting recognition errors. In another aspect, a spoken word can be recognized based on alternatives suggested by a handwriting recognition engine and the recognized spoken word can replace the handwritten recognized word on a display. In a further aspect, a user interface is provided which accepts speech input and allows for in-place correction of machine-generated text based on handwriting recognition.

Aspects of the present invention relate to systems and methods for processing electronic ink. Such systems and methods may include: (a) receiving electronic ink input (e.g., through an input device, such as a digitizer); (b) generating a list of machine-generated objects based on the electronic ink input, the list including a first machine-generated object and alternative machine-generated objects; (c) converting the electronic ink input to the first machine-generated object; (d) displaying the first machine-generated object; (e) receiving speech input; (f) converting the speech input to a second machine-generated object (e.g., using a speech recognition engine), wherein the second machine-generated object is one of the alternative machine-generated objects and the list of machine-generated objects functions as a dictionary used for converting the speech input; and (g) replacing the first machine-generated object with the second machine-generated object. The machine-generated objects may correspond to words, lines, and/or other groupings of machine-generated text.

In some aspects of the invention, a user may confirm that the second machine-generated object is correct; and the system will replace the first machine-generated object with the second machine-generated object. Systems and methods according to some aspects of the invention may display the list of alternative machine-generated object candidates to the first machine-generated object based on the electronic ink input. In one aspect, the list of alternative machine-generated object candidates includes object candidates generated by a handwriting recognition engine based on the electronic ink input and object candidates based on a statistical language model (e.g., unigram, bigram, trigram).

Additional aspects of the invention relate to computer-readable media including computer-executable instructions stored thereon for performing various methods and/or operating various systems, including systems and methods like those described above.

III. Example Hardware

FIG. 1 illustrates a schematic diagram of a general-purpose digital computing environment that can be used to implement various aspects of the present invention. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), which contains the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices often are connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 1, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 1 environment shows one example environment, it will be understood that other computing environments also may be used. For example, one or more examples of the present invention may use an environment having fewer than all of the various aspects shown in FIG. 1 and described above, and these aspects may appear in various combinations and subcombinations that will be apparent to one of ordinary skill.

Figure 2:
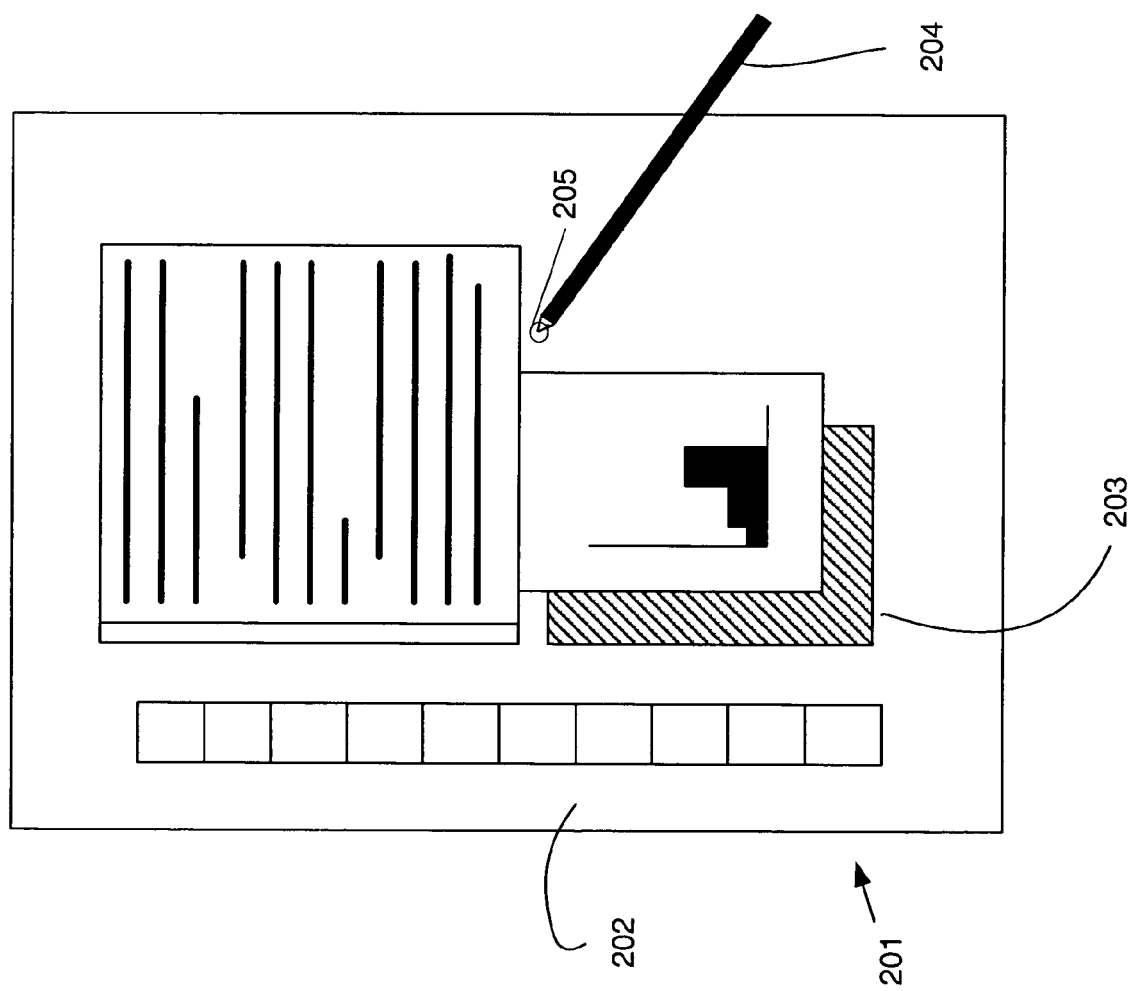
FIG. 2 illustrates a pen-based personal computing (PC) environment in which certain aspects of the present invention may be implemented.

FIG. 2 illustrates a pen-based personal computer (PC) 201 that can be used in accordance with various aspects of the present invention. Any or all of the features, subsystems, and functions in the system of FIG. 1 can be included in the computer of FIG. 2. The pen-based personal computer system 201 includes a large display surface 202, e.g., a digitizing flat panel display, such as a liquid crystal display (LCD) screen, on which a plurality of windows 203 is displayed. Using stylus 204, a user can select, highlight, and write on the digitizing display area and thereby enter electronic ink data into the system. Examples of suitable digitizing display panels include electromagnetic pen digitizers, such as pen digitizers available from Mutoh Co. (now known as FinePoint Innovations Co.) or Wacom Technology Co. Other types of pen digitizers, e.g., optical digitizers, may also be used. The pen-based computing system 201 interprets gestures made using stylus 204 in order to manipulate data, enter text as electronic ink, and execute conventional computer application tasks, such as creating, editing, and modifying spreadsheets, word processing programs, and the like.

The stylus 204 may be equipped with buttons or other features to augment its capabilities. In one example, a stylus 204 could be implemented as a "pencil" or "pen", in which one end constitutes a writing portion and the other end constitutes an "eraser" end, and which, when moved across the display, indicates portions of electronic ink on the display that are to be erased. Other types of input devices, such as a mouse, trackball, keyboard, or the like also could be used. Additionally, a user's own finger could be used as an input device, e.g., for selecting or indicating portions of the displayed image on a touch-sensitive or proximity-sensitive display. Consequently, the term "user input device," as used herein, is intended to have a broad definition and encompasses many variations on well-known input devices.

In various examples, the system provides an ink platform as a set of COM (component object model) services that an operating system and/or an application program can use to capture, manipulate, and store ink. The ink platform also may include a mark-up language including a language like the extensible markup language (XML). Further, the system may use DCOM (distributed component object model) as another implementation. Yet further implementations may be used including the Win32 programming model and the Net programming model from Microsoft Corporation. These platforms are commercially available and known in the art.

In addition to use with full performance pen-based computing systems or "tablet PCs" (e.g., convertible laptops or "slate" type tablet PCs), aspects of this invention can be used in conjunction with other types of pen-based computing systems and/or other devices that accept data as electronic ink and/or that accept process, or display electronic pen or stylus input, such as: hand-held or palm-top computing systems; personal digital assistants; pocket personal computers; mobile and cellular telephones, pagers, and other communication devices; watches; appliances; and any other devices or systems that include a monitor or other display device and/or a digitizer that presents printed or graphical information to users and/or allows input using an electronic pen or stylus or which can process electronic ink collected by another device (e.g., a conventional desktop computer that can process electronic ink collected by a tablet PC).

The invention now will be described in conjunction with the remaining figures, which illustrate various examples of the invention and information to help explain the invention. The specific figures and information contained in this detailed description should not be construed as limiting the invention.

IV. Example Systems, Methods, and Computer-Readable Media According to the Invention As described above, aspects of the present invention relate generally to systems and methods for processing electronic ink in pen-based computing systems and other computing systems.

In some instances, handwriting recognition technology will not correctly identify the original ink words producing machine-generated text that does not correctly correspond to the handwritten ink. Users may desire to correct these errors. Handwriting recognition of electronic ink input and correction of machine-generated text is provided in, for example, the tablet PC input panel (TIP) found in the Tablet PC of Microsoft Corporation, the "Convert Handwriting to Text" function in the actions drop down menu in Microsoft Windows Journal (Journal) and "Convert Ink to Text" function in a drop down menu in Microsoft OneNote (OneNote). TIP, Journal and Onenote each have different user interfaces for both calling the handwriting recognition engine and for correcting handwriting recognition errors.

Figure 3:
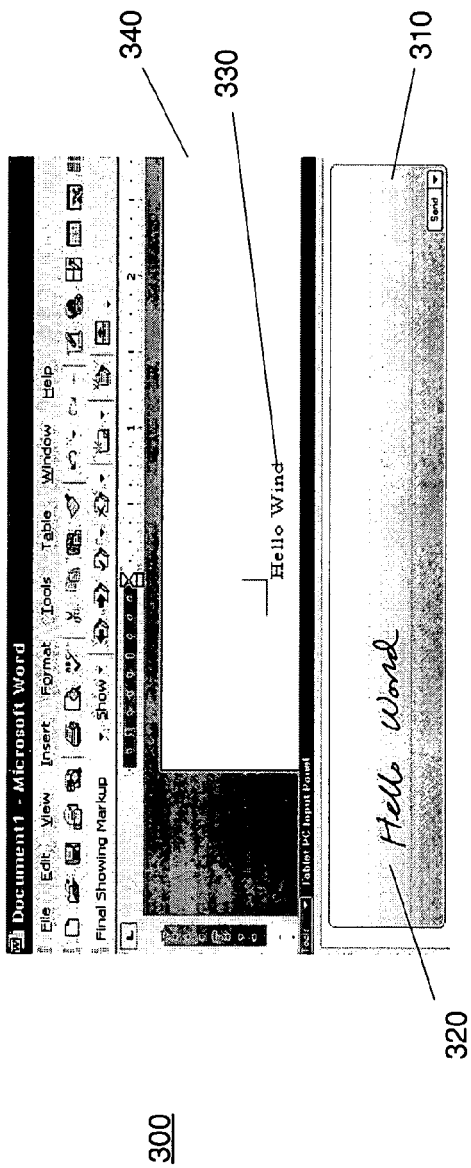
FIG. 3 shows an illustrative user interface utilized in a tablet PC input panel for handwriting recognition correction.

FIG. 3 shows an illustrative user interface 300 for TIP in a pen-based computer system. TIP provides a writing pad 310 for the user to input data in electronic ink format. The electronic ink data 320 input to the writing pad 310 is converted to machine-generated text by a handwriting recognition engine in the processor of the computer system. In the example of FIG. 3, a user has written the phrase, "Hello World" in electronic ink on the writing pad 310 of the TIP user interface 300 of a pen-based computing system. The system collects the ink data as the user inputs it, and then displays the sentence in the user's handwriting in electronic ink 320 on the writing pad 310. The ink data can be collected in any suitable manner and stored in any suitable format, such as ink serialized format ("ISF"). After the electronic ink data is collected, the system automatically sends the data to the handwriting recognition engine, which will attempt to recognize the handwritten ink data and convert the ink data to machine-generated text. Once the handwriting recognition engine has processed the electronic ink input data, it returns the recognized text to the application program (and/or otherwise makes it available to the application program). In this example, the machine-generated text 330 is displayed in the window 340 of the open application, e.g., Microsoft Word. As shown, the electronic ink input data 320 has erroneously been recognized and converted to the machine-generated text 330 "Hello Wind". To correct the handwriting recognition error, a user can rewrite the word on the writing pad 310, i.e., input the electronic ink input data, and have the system recognize the word again. This correction mechanism may not work because rewriting the same phrase can result in another erroneous recognition. Alternatively, a user can correct the erroneous recognition using a physical or soft keyboard to input the correct word.

Figure 4:
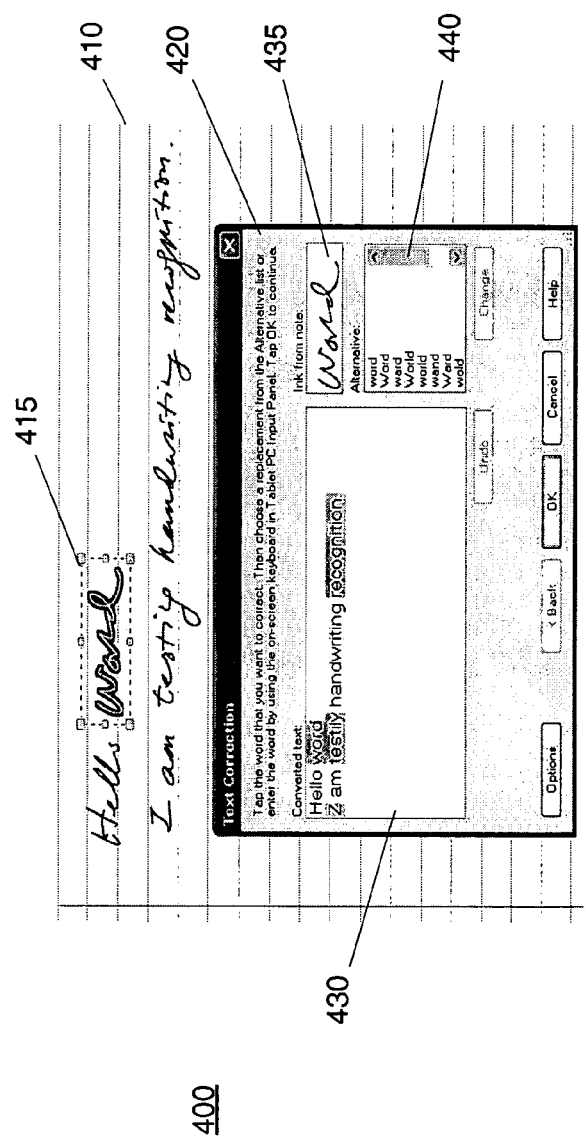
FIG. 4 shows an illustrative user interface utilized in Microsoft Windows Journal for handwriting recognition correction.

FIG. 4 shows an illustrative user interface 400 for Journal in a pen-based computer system. In FIG. 4, the user has input electronic ink data on separate lines on Journal page 410 "Hello World" and "I am testing handwriting recognition". When the user desires to convert the handwritten electronic ink input data to machine-generated text, the user selects the ink to be converted and, from an "Actions" drop down menu, chooses the function of "Convert Handwriting to Text" from the menu. In this example, the ink data "World" 415 is being considered for correction. Responsive to the user choosing the function of "Convert Handwriting to Text" from the drop down menu in this example, the text correction dialog 420 is displayed on the user interface 400. As shown, the electronic ink input data is recognized and converted and displayed in the converted text region 430 of the text correction dialog 420. The "to be corrected" electronic ink input data is displayed in the ink region 435 of the text correction dialog 420. Also, a list of possible alternatives for the electronic ink input data displayed in the ink region 435 is displayed in the alternative candidate list 440 of the text correction dialog 420. To correct errors in the electronic ink input data, the user can select one of the alternatives from the alternative list 440 or enter the word by using a keyboard in TIP. Should the, user wish to correct the text associated with other electronic ink input data, she can select the word she wants to correct by tapping on the word with the stylus in the converted text region 430. Responsive to the selection of another word, the electronic ink corresponding to the selected word will appear in the ink region 435 and alternative candidates will be displayed in the alternative candidate list 440.

In OneNote, the user selects the desired handwritten ink data to be converted and chooses the "Convert Ink to Text" function from a Tools drop down menu. In response to selection of this function, Onenote replaces the original ink with machine-generated text. To correct a word, a user can delete the erroneous word, rewrite the word and perform another ink to text conversion or the user can correct the erroneous word by using a keyboard, such as a soft keyboard.

Selection of the electronic ink data in the examples above could take place in any suitable or desired manner or as the result of any suitable or desired action. For example, touching a stylus on the display screen (a "pen-down event") will result in selection of the specific word at the location of the contact (e.g., if the stylus contacts the digitizer screen within the "bounding box" occupied by a word, this action will result in selection of that word). In other examples, a stylus may be detectable by a digitizer while hovering adjacent to the digitizer's surface. For example, some styli are "active," which in this specification means that they transmit, reflect, alter, or otherwise modify energy, data, or other information transmitted by and/or detectable by a digitizer when the stylus is located near the digitizer surface. As examples, a stylus may include circuitry or other structure that receives energy emitted by the digitizer and/or alter magnetic or electronic fields transmitted by and/or sensed by the digitizer, such that the presence of the stylus near the digitizer surface can be sensed by the digitizer due to changes in detected magnetic or electric fields. As another example, a stylus may transmit or reflect data, electrical or magnetic fields, or other energy or information that is detectable by the digitizer, at least when located near the digitizer surface. Any suitable or desired way of sensing or detecting the presence of a stylus when it is located near a digitizer surface may be used. Although a stylus and digitizer combination may be designed to allow detection of a stylus at virtually any reasonable position with respect to the digitizer surface, in at least some conventional pen-based computing systems with active pens, the stylus is initially detectable when it is about one-half to two inches from the digitizer surface, and in some examples, when it is approximately a half inch to an inch from the digitizer surface. In such systems, if desired, selection of a word may result when the stylus hovers above the surface of the display screen, and the word immediately beneath or adjacent the tip of the stylus during the hover action will be the word selected (e.g., if the hover action occurs over a bounding box of a word, that word will be selected).

As can be seen from the above examples, the user can either correct the word in two independent alternatives. First, by deleting the erroneous word and rewriting with the hope that the handwriting recognition engine will properly recognize and convert the ink data. Obviously, this correction mechanism may not work because rewriting the same phrase can result in another erroneous recognition. Alternatively, the user can use a keyboard (e.g., a soft keyboard or physical keyboard) to correct a word. This requires the user to employ the keyboard, which may not always be convenient, much less desired. Accordingly, it would be helpful to provide another methodology to correct handwriting recognition/conversion errors.

Figure 5:
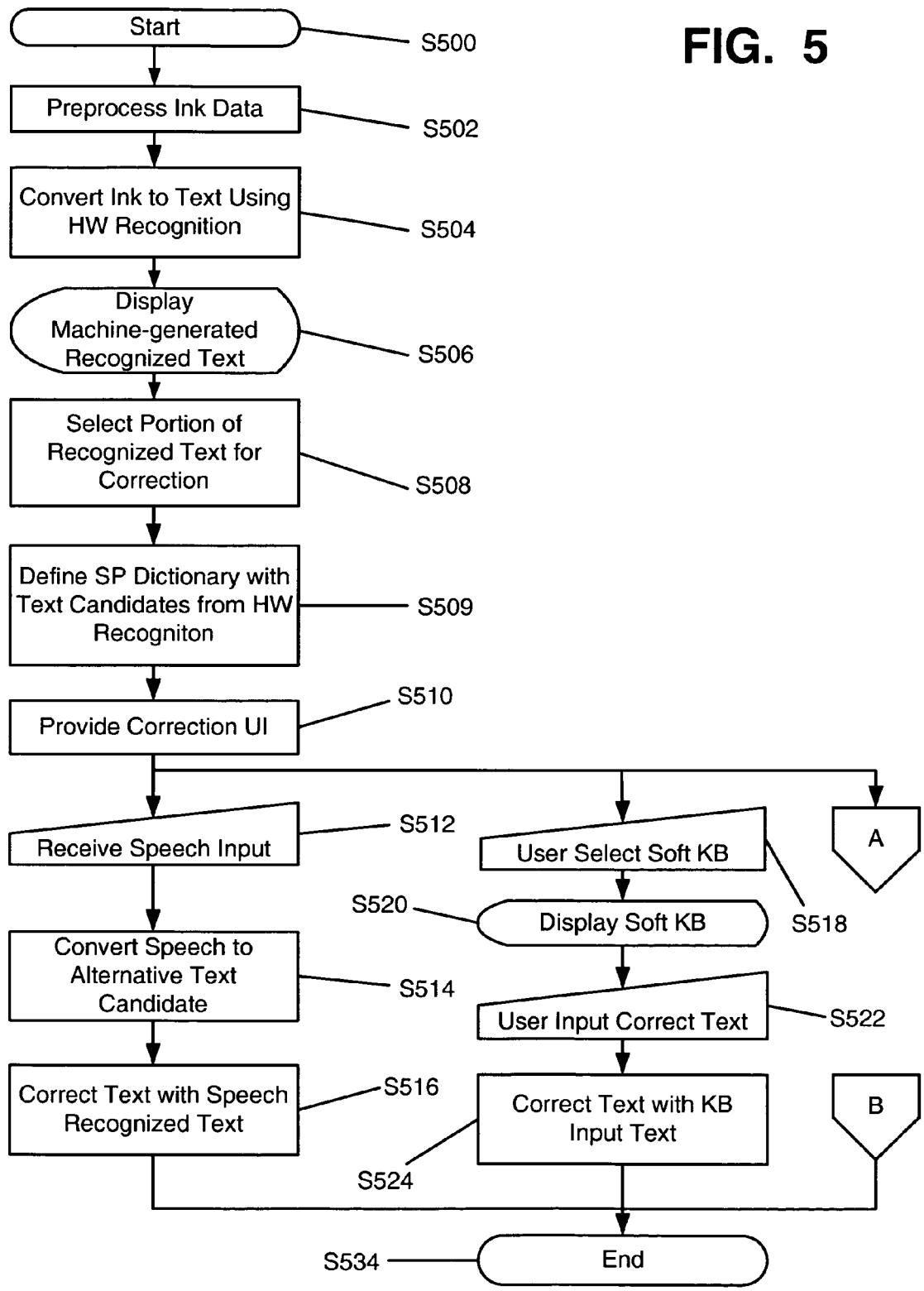
FIGS. 5 and 6 show an example flow diagram illustrating procedures followed in at least some examples of this invention.

FIG. 5 provides an illustrative flow diagram describing an example process that can be used to correct a handwriting recognition error according to certain implementations of the invention. When the process starts at step S500, the pen-based system receives an electronic ink input. As described, ink data can be gathered in any suitable manner and in any suitable format without departing from the invention, including in manners and formats that are conventional and known to those skilled in the art (such as ISF format). In step S502, an ink parser, preferably part of the operating system 195, analyzes and classifies the electronic ink input data as handwriting or drawing data, and if handwriting data, analyzes and groups the electronic ink input as text, e.g., word, line and paragraph. For illustrative purposes, the present invention will be described in terms of the electronic ink input data being handwriting, though the invention is not so limited.

Figure 7:
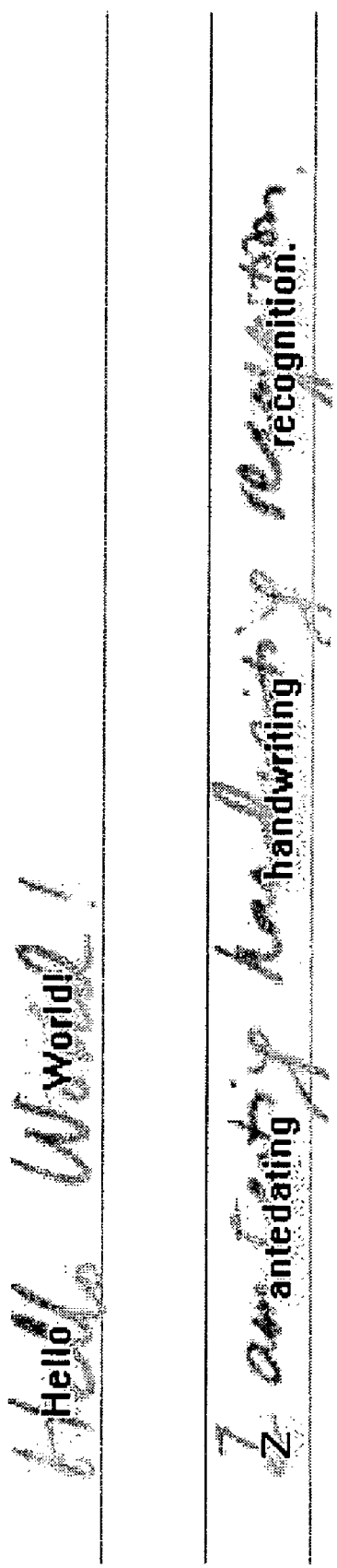
FIG. 7 depicts a screen with electronic ink data and the associated machine-generated text that resulted from handwriting recognition in an illustrative implementation of the present invention.

Once the original electronic ink input data has been collected, analyzed and classified as handwriting (optionally, at various times while the ink data is being entered), the ink parser can send the electronic ink data to a handwriting recognition engine (e.g., in one implementation the handwriting recognition in Microsoft WISP (Windows Ink Services Platform) found in the Windows XP Tablet PC Edition operating system). The handwriting recognition engine converts the electronic ink input to machine-generated text in step S504. In step S506, the system displays the machine-generated text corresponding to the electronic ink input on a display such as a Tablet PC display screen. In one implementation of steps S504 and S506 involving a Tablet PC, the user can select the "Tools" drop down menu, followed by selecting the option "Convert Ink to Text" from the "Tools" menu. Responsive to the user commands, the electronic ink input is converted to machine-generated text, which is displayed together (e.g., on top of or adjacent to) with the electronic ink. Alternatively, the machine-generated text may be displayed in place of the electronic ink. FIG. 7 shows an example of how the information may be displayed in steps S506. In this example, the original handwriting is softened and the converted text is shown on top of the original handwriting.

After converting the electronic ink input to machine-generated text, the user may select a portion of the machine-generated text for correction in step S508. For example, to select the portion of text, the user may tap the area on the display with the stylus where the text is shown or hover over the portion of text with the stylus. The portion selected for correction may correspond to a word, letter, phrase, or sentence. The following discussion will describe an illustrative implementation of the invention involving correction of a word. It will be appreciated by one skilled in the art that the invention is not so limited, and the principles applied to a word can be applied to other portions of text for correction.

When converting the electronic ink to text in step S504, the handwriting recognition also generates a list of alternative machine-generated text candidates, which might be correct candidates for the electronic ink input. For example, the electronic ink input may be recognized as the machine-generated text "I", but other probable alternatives machine-generated text candidates that may be returned include "1", "L", "!", "i", "l" or "Z" due to their string similarity to "I". In step S509, the alternative-machine generated text candidates obtained from handwriting recognition for the selected word are defined as the dictionary for speech recognition. At this point speech input may be enabled.

A correction user interface can be provided to the user in step S510. The correction UI may automatically be provided or may be provided in response to a user input requesting the correction UI. The correction UI may at least in part take the form of a graphical user interface, which may include the ink representation of the selected portion for correction and also can, but does not have to, display the alternative machine-generated text candidates. The alternative machine-generated text candidates can be displayed, for example as a drop down menu, at the request of the user (e.g., by tapping on a portion of the UI). Initially, the list of alternative machine-generated text candidates may include only alternative text candidates identified during the handwriting recognition process as defined in step 509. In this instance, the alternative text candidates identified during handwriting recognition can be used as the dictionary or vocabulary for speech recognition. In an alternative implementation, the alternative text candidates can include text candidates identified by a statistical language model with or without the alternative text candidates identified by the handwriting recognition engine to be used as the dictionary for speech recognition. The alternative text candidates may be displayed to the user in an order or with some other type of representation (e.g., symbol next to the candidate) indicating a confidence measure that a respective alternative text candidate corresponds to the electronic ink input.

Also, the user may request (e.g., by a pen down event on a portion of the correction user interface) that the initial dictionary for speech recognition be expanded to include additional machine-generated text candidates. The user may make such a request when the correct candidate is not found in the list of alternative machine-generated text candidates identified during handwriting recognition. In one implementation, the vocabulary for speech recognition can be expanded to include additional alternative machine-generated text candidates obtained from the statistical language model (LM). In one implementation, the text candidates obtained from the LM may be displayed together with list of text candidates identified during handwriting recognition with the confidence level of each candidate being represented to the user, for example by ranking most likely candidate to least likely candidate from the top of the list to the bottom of the list.

An illustrative LM that may be used to generate the alternative text candidates is the n-gram LM. In the LM, items of a unigram, bigram and trigram may be contained. It will be appreciated to one skilled in the art that a myriad of LMs may be used to identify additional machine-generated text candidates and that the use of unigram, bigram and trigram is merely illustrative. Based on the machine-generated text candidate and LM candidate list, a Viterbi search, known to those skilled in the art, may be performed to identify a path with the highest LM score among the candidate lists. Each node in the path can be assumed to be the most reasonable candidate (e.g., word in a grouping of words such as a sentence).

Once the correction user interface (UI) has been presented to the user in step S510, several methodologies for correction of the machine-generated text candidate may be available including, among others, correction by speaking a text candidate, correction by input through a soft keyboard, and correction by selecting a text candidate from a displayed list of alternative text candidates. Each of these possibilities will be discussed.

For correction by speaking a text candidate, the step S5 10 of providing the correction user interface (UI) can include providing a mechanism for accepting speech input. Speech input may be enabled by, for example, a user tapping the stylus on a microphone icon, such as shown in the correction UI shown in FIG. 8. A user can speak the correct word using a speech input element such as a headset or microphone (e.g., built in to the computer), which is associated with the pen-based computer. The user speaks the word for correction into a speech input element and the speech input is received at step S512.

Figure 8:
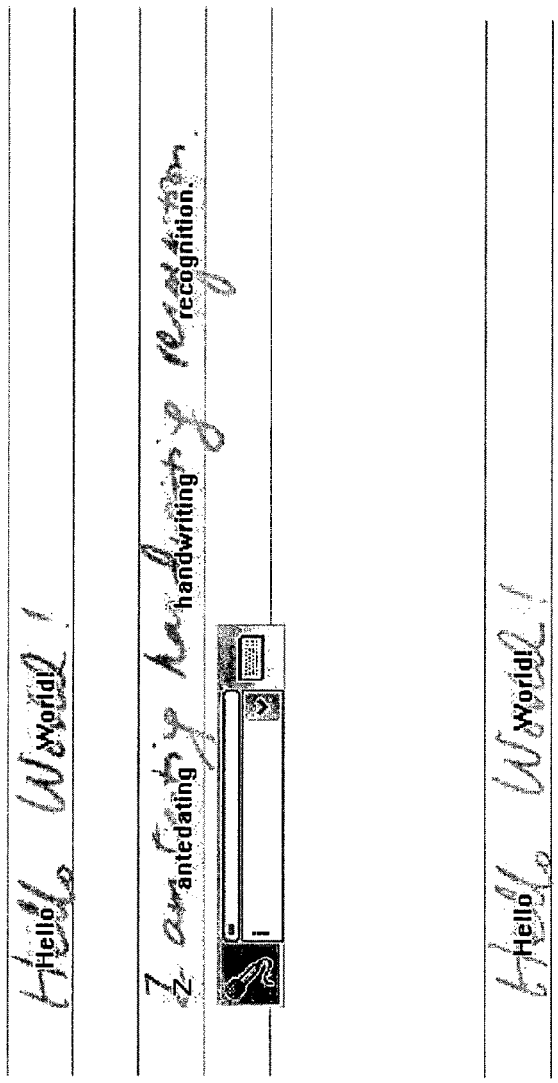
FIG. 8 depicts a screen including a correction user interface with a text candidate generated by speech recognition for correcting a previously incorrectly recognized ink input according to an illustrative embodiment of the present invention.

In step S514, the speech input is converted into an alternative machine-generated text candidate, the candidate being present in the alternative machine-generated text candidates list, which serves as the dictionary for speech recognition. In one implementation involving a pen-based system from Microsoft Corporation, the speech recognition engine processes the speech input using the Microsoft SAPI (speech API) 5.1 with context-free grammar (CFG). The CFG grammar uses the vocabulary/dictionary for speech recognition created from the output of the handwriting recognition engine. When the user speaks the correct word, the speech recognition engine selects the alternative machine-generated text candidate corresponding to the spoken word from the list of text candidates and replaces the incorrect word with the machine-generated text candidate recognized by the speech recognition engine in step S516. The machine-generated text candidate recognized by speech recognition can first be displayed, for example in the correction UI of FIG. 8 prior to correction. Upon user confirmation, for example by tapping outside the correction UI in FIG. 8 (or acknowledging through speech or other input mechanism), the text candidate identified by speech recognition can replace the incorrect word in the text sequence on the display. In the example of FIG. 8, the incorrect text recognized is the letter "Z", and the user has spoken the text candidate "i". If necessary, the user could open the drop down menu by hovering or by way of tapping the stylus on the down arrow in the correction UI. The drop down menu might provide another alternative speech recognition text candidate such as a capital "I" which the user could then select causing the letter "Z" to be replaced with "I".

At step S534 the correction process may be completed although it should be understood that the process may be repeated or another methodology for correction may be used.

Figure 9:
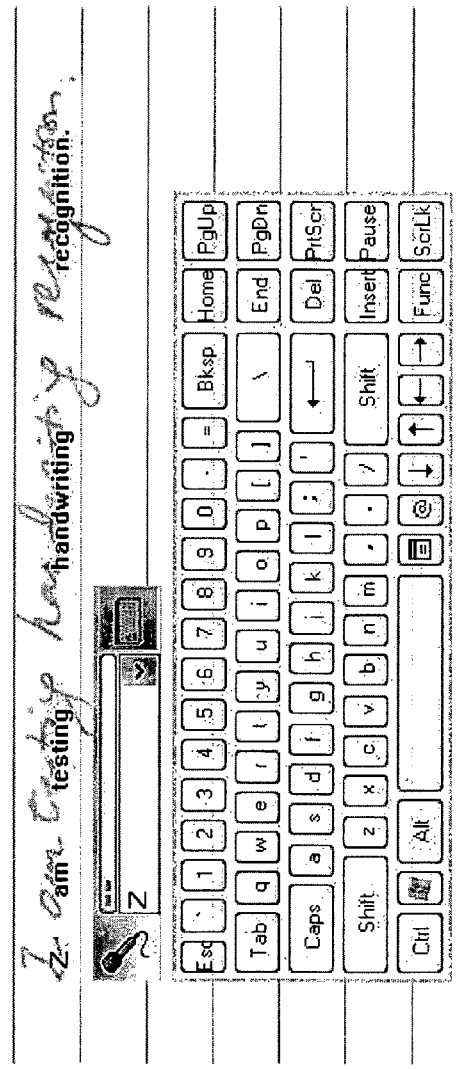
FIG. 9 depicts a screen including a correction UI after a user has requested a soft keyboard in connection with an illustrative embodiment of the present invention.

For correction by input through a soft keyboard, the step S510 of providing the correction UI provides a mechanism allowing a user to select a soft keyboard for correction in step S518. Responsive to a user selection of a soft keyboard, a soft keyboard is on the display in step S520. An illustrative example of a correction UI after the soft keyboard has been displayed is shown in FIG. 9. In the example of FIG. 8, the incorrect text recognized is the letter "Z". In steps S524, to correct the text, the user can tap on a soft key(s) with the stylus to input the correct text and then tap on area outside the correction UI to cause the text to be corrected by replacing the text with the soft key input. At this point the correction process has been completed at step S534.

Figure 10:
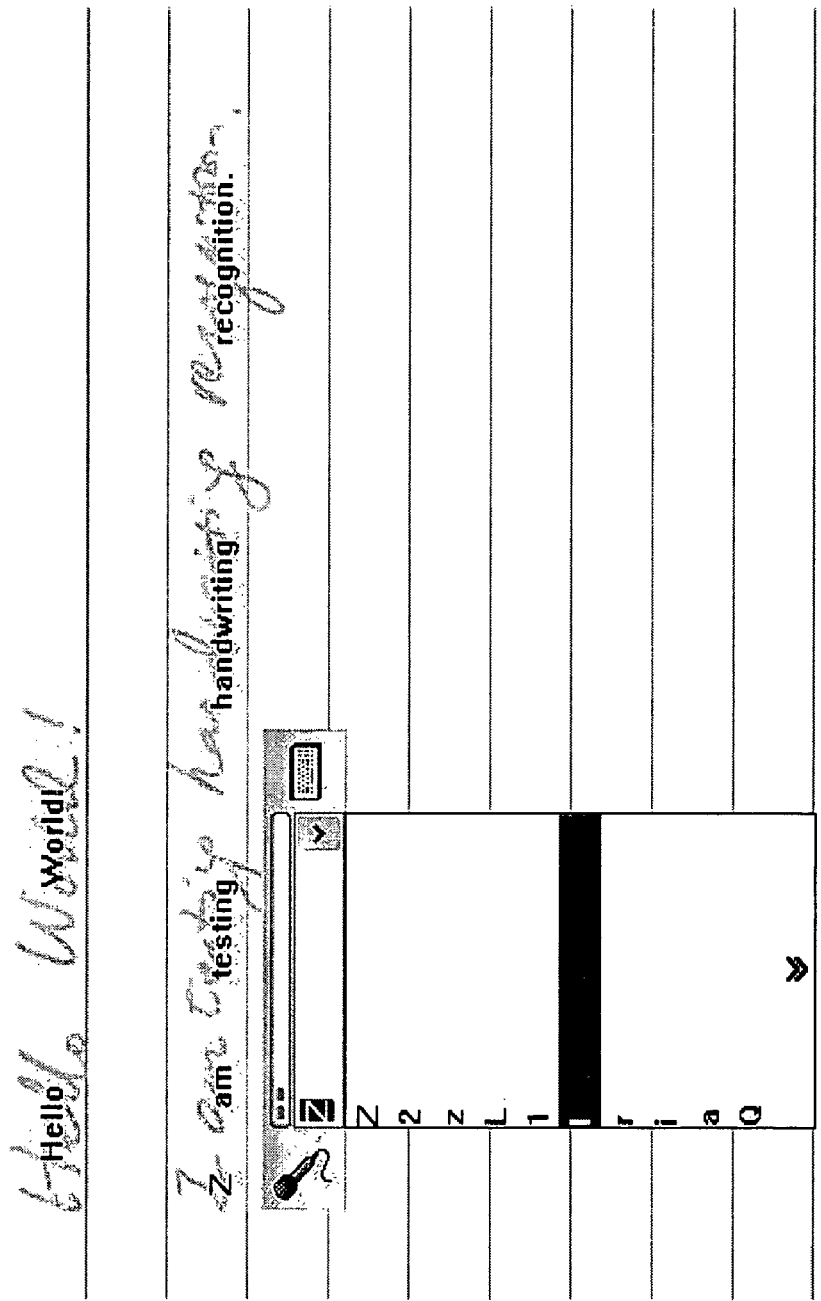
FIG. 10 depicts a screen including a correction user interface with a drop down menu of alternative text candidates according to an illustrative implementation of the present invention.

For correction by selecting a text candidate from a displayed list of alternative text candidates, the correction UI in step S510 can display the list of alternative text candidates or provide an interface allowing the user to request display of the alternative text candidates in step S526. Responsive to user selection causing a dropdown menu to open, the alternative text candidates provided by the handwriting recognition engine can be displayed in step S528, such as in confidence order as shown in FIG. 10. From the list of alternative text candidates, in step S530 the user can select the correct text candidate by, for example, tapping the stylus on the correct text candidate. Selection however, may take other forms such as by speech recognition, for example by receiving speech input and converting the recognized speech to the alternative text candidate as described above in connection with correction by speech recognition.

Also, the step of displaying the list of alternative text candidates in step S528 can include expanding or replacing the list of text candidates by, for example, tapping on the down arrow button at the bottom of the correction UI shown in FIG. 10. In this instance, the LM may be activated and an additional list of alternative text candidates can be displayed including the alternative text candidates suggested by the LM. In one implementation, the number of alternative text candidates in the list may include twenty, though the number of candidates may be selected to accommodate display real estate or to provide all the candidates which exceed a certain threshold confidence level. It should be noted that obtaining LM text candidates can be processing intensive and the number of candidates may be limited based on the processing time needed to generate the LM candidate list.

In step S532, to correct the text, the user can tap on or hover over the text candidate in the candidate list with the stylus to replace the incorrect text. It will be appreciated that selecting the text candidate in step S532 could involve the user speaking one of the alternative text candidates on the alternative text candidate list with or without the user confirming that the speech recognized input is correct to replace the incorrect text. At step S534 the correction process may be completed although it should be understood that the process may be repeated or another methodology for correction may be used.

Figure 6:
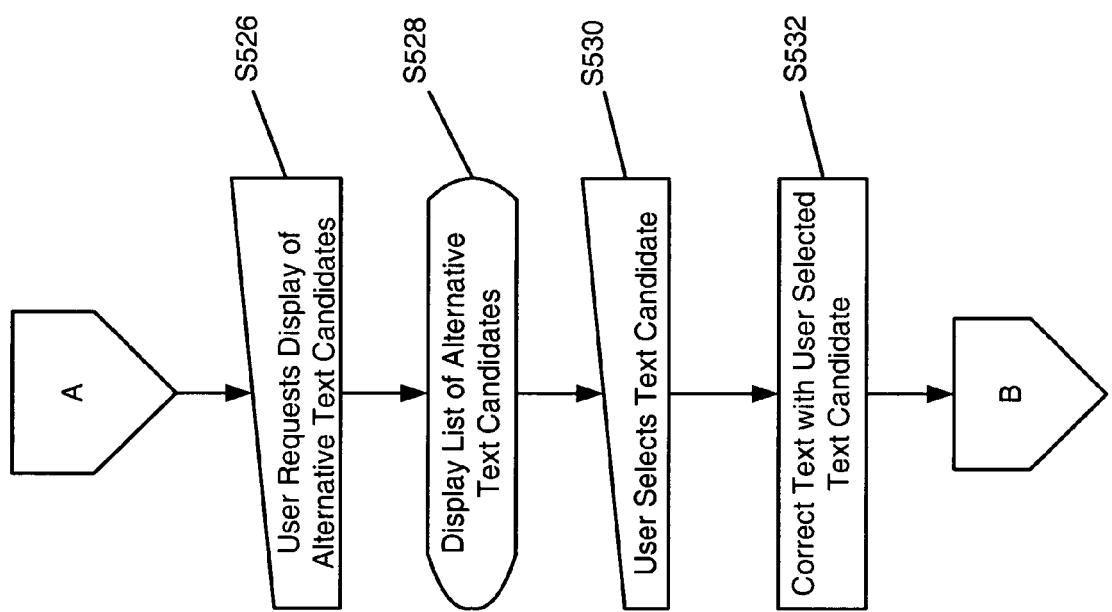

Of course, FIGS. 5 and 6 merely constitute an example of steps that may be taken in accordance with at least some examples of the invention. Those skilled in the art will recognize that the content of the specific steps may be changed, the steps may be performed in a different order, additional steps may be added, and/or existing steps may be omitted or combined without departing from the invention.

Parsing errors can occur when the handwriting recognition engine recognizes electronic ink input data as two or more words where the ink input data was intended to represent one word or when electronic ink input data is recognized as one word where the input was intended to represent more than one word. Implementations of the invention allow for correction of parsing errors. User can select the correct grouping of electronic input text data by, for example circling (e.g., defining a region encompassing) the appropriate text with the stylus to either separate or group the appropriate text. Thus, when two words have been recognized when the user intended the ink strokes of the recognized words to be a single word, the user may circle the ink strokes making up both words with the stylus to indicate that they should be grouped together and considered as one word. Similarly, if two words have been recognized as one word the user can circle the ink strokes corresponding to a portion of the recognized word to indicate that the circled ink strokes in the corresponding recognized word and the remaining ink strokes in the corresponding recognized word should be recognized as separate words.

Figure 11:
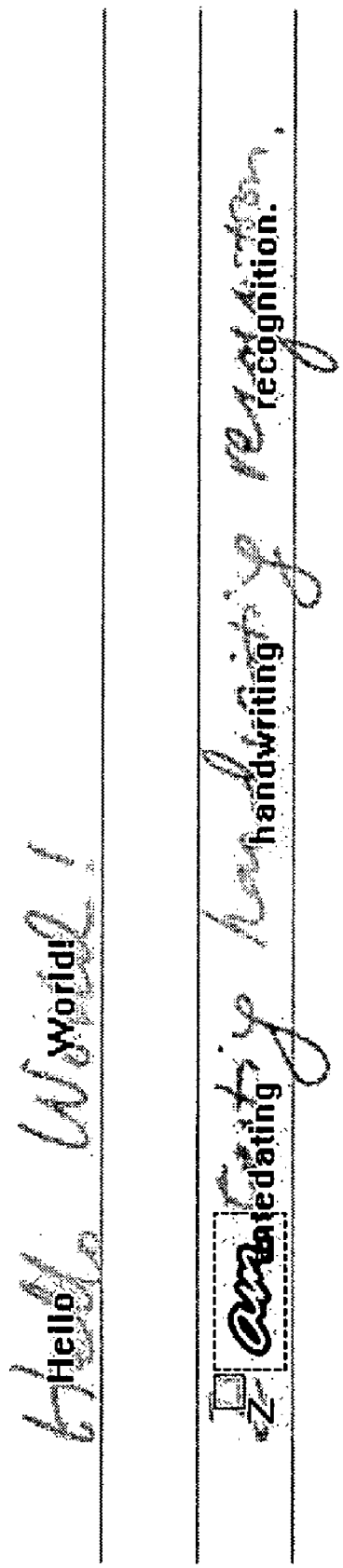
FIG. 11 depicts a screen showing how a parsing error may be corrected according to an illustrative embodiment of the present invention.

FIG. 11 shows a user interface where the written phrase "am testing" has been recognized as "antedating". In the FIG. 11 example, the user has circled the ink strokes with the stylus corresponding to the word "am". The selected ink strokes can be highlighted in some manner, such as shown in FIG. 11, once the user lifts the stylus from the digitizer. At this juncture, the user can provide an input (e.g., tapping the stylus on or hover over the highlighted portion, providing a voice command) causing the handwriting recognition engine to convert the selected ink strokes to text and the other non-highlighted input strokes (corresponding to "testing") to text. The machine-generated text candidate is displayed. The operation for grouping strokes is analogous in that the grouped strokes are highlighted, the user provides an input requesting the handwriting recognition engine to convert the strokes to text, and the resulting machine-generated text candidate is displayed.

Below is a more detailed explanation of applying the LM to generate the previously described candidate lists. Given a word sequence,

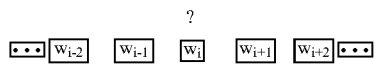

the handwriting recognition engine gives each word $w_i$ some candidates. Assume the user wants to correct the word $w_i$, a word list which the speech recognition engine can use must be generated. The idea is that the words in the dictionary can be filtered using the string similarity, and then the LM can be used to calculate the probability that the word appears in the context. Finally, the weighted sum of the score in the LM and the score in string similarity are used for ranking the words in the dictionary for the speech recognition engine. In one implementation, twenty candidates may be selected, though this number can vary. One factor that may influence the number of candidates is display real estate.

The candidates for the word $w_i$ given by the handwriting recognition engine may not contain the correct word, but the sub segments of the correct word are usually the sub segments of these candidate words. Thus string similarity information may be used to determine candidates. A string matching process may be conducted using the Dynamic Programming String Alignment algorithm. For example, assume the word "these" and the word "horses", the result of string matching is as below.

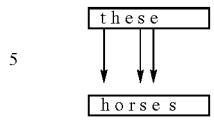

The count of the matched characters is 3. The candidates of $w_i$ given by the handwriting recognition engine are represented as $w_{i,j}$. To a word $d_k$ in the dictionary, the similarity between $d_k$ and $w_{i,j}$ is defined as $$s_{sim}(d_k, w_{i,j}) = \log\left(\frac{c_{match}(w_{i,j}, d_k)}{len(w_{i,j}) + len(d_k)}\right)$$

The $c_{match}(w_{i,j}, d_k)$ is the count of the matched characters between $d_k$ and $w_{i,j}$ (considering order), the $len(w_{i,j})$ is the character count of word $w_{i,j}$, and the $len(d_k)$ is the character count of word $d_k$. To the word "these" and the word "horses", $$s_{sim}(\text{"these"}, \text{"horses"}) = \log\left(\frac{3}{5+6}\right) \approx -0.564271$$

The score of $d_k$ in string similarity is $$s_{sim}(d_k) = \max(s_{sim}(d_k, w_{i,j}))$$

Theoretically speaking, every word $d_k$ in the dictionary is a candidate of $w_i$ for the speech recognition engine. But if the string similarity between $d_k$ and any $w_{1,j}$ is very small, it is not necessary to use $d_k$ as the candidate of $w_i$ for the speech recognition engine, because it can be assumed that although the handwriting recognition engine cannot give the correct word, it can give some (enough) characters of the correct word. For example, if the candidate of $w_i$ that the handwriting recognition engine provides is "these", the word "is" is almost impossible to be the correct word of $w_i$ because the similarity between the two words is very small. Applying this method, the computing complexity can be reduced. Furthermore, because the count of the common characters between $d_k$ and any $w_{i,j}$ (not considering order) is equal to or greater than the count of the matched characters between $d_k$ and $w_{i,j}$, if there is no common character between $d_k$ and $w_{i,j}$ or the count of the common characters is very small, the string similarity between $d_k$ and any $w_{i,j}$ does not need to be calculated.

For each word $d_k$ in the dictionary following the string matching process, the LM model

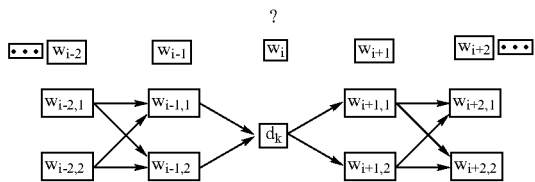

can be applied to calculate the probability of occurrence of the word $d_k$ in the word sequence using the Language Model.

$$P(w_{i-2}w_{i-1}d_kw_{i+1}w_{i+2}) = \max(p(w_{i-2,j_{i-2}}w_{i-1,j_{i-1}}d_kw_{i+1,j_{i+1}}w_{i+2,j_{i+2}}))$$

The score of the word $d_k$ in the LM is $$s_{LM}(d_k) = \log(P(w_{i-2}w_{i-1}d_kw_{i+1}w_{i+2}))$$

To generate the word list for the speech recognition engine, the score of the LM and the score of the string similarity can be combined and weighted to obtain the weighted score, $$s(d_k) = s_{LM}(d_k) + \lambda * s_{sim}(d_k)$$

$\lambda$ is the weight of the score of string similarity. Using the weighted score, the confidence level associated with each word can be determined relative to other words and the words can be ranked based on the probability that they would correspond to the electronic ink input. In one implementation, the top twenty words may be selected.

In sum the steps for generating candidates using the LM is 1) the words in the dictionary are filtered using the string similarity score; 2) the LM score is calculated; and 3) the words are ranked using the weighted sum of the LM score and the string similarity score, and the top (e.g., twenty) ranked words are selected as machine-generated text candidates.

Those skilled in the art will recognize that aspects of this invention can be applied to any type of electronic ink data and machine-generated objects, including handwritten text in any language and written or read in any direction without departing from the invention. Additionally, aspects of this invention can be applied to recognition and processing of other types of data and machine-generated objects without departing from the invention, such as data and elements in charts, diagrams, graphs, flowcharts, etc.; musical data or symbols; mathematical or scientific data or symbols; drawings; etc.

Finally, the present invention also relates to computer-readable media including computer-executable instructions stored thereon for performing various methods and/or for use in various systems, including those systems and methods described above. The computer-readable media may constitute computer-executable instructions stored on the various specific examples of computer-readable media described above.

V. Conclusion

Various examples of the present invention have been described above, and it will be understood by those of ordinary skill that the present invention includes within its scope all combinations and subcombinations of these examples. Additionally, those skilled in the art will recognize that the above examples simply exemplify various aspects of the invention. Various changes and modifications may be made without departing from the spirit and scope of the invention, as defined in the appended claims.

The invention claimed is:

1. A method comprising:
receiving electronic ink input;
generating a list of machine-generated text candidates based on the electronic ink input, the list including a first machine-generated text candidate and alternative machine-generated text candidates;
converting the electronic ink input to the first machine-generated text candidate;
displaying the first machine-generated text candidate;
receiving speech input;
converting the speech input to second machine-generated text, wherein the second machine-generated text is one of the alternative machine-generated text candidates and the list of machine-generated text candidates functions as a dictionary used for converting the speech input pursuant to a statistical language model, to generate for every instance of a spoken word $d_k$ in the dictionary, the similarity between $d_k$ and list of machine-generated text candidates $w_{i,j}$ being represented as a function defined as the logarithmic value of a count of the matched characters $w_{i,j}$, $d_k$ divided by a value of the sum of the length of $w_{i,j}$ and $d_k$;
analyzing when the string similarity between $d_k$ and $w_{i,j}$ is very small, including the optimum constraint, with $d_k$ being completely discounted as a candidate of $w_i$ for converting the speech into text; and
replacing the first machine-generated text candidate with the second machine-generated text.

2. The method of claim 1, wherein the first machine-generated text candidate is a word.

3. The method of claim 1, wherein the first machine-generated text candidate is a portion of a word.

4. The method according to claim 1, further comprising receiving input selecting the first machine-generated text candidate prior to receiving the speech input.

5. The method according to claim 4, wherein the selecting includes touching a user input device to a digitizer screen at a location corresponding to the first machine-generated text candidate.

6. The method according to claim 4, wherein the first machine-generated text candidate is a group of words or part of a word.

7. The method according to claim 1, further including displaying the list of machine-generated text candidates prior to receiving the speech input.

8. The method according to claim 7, wherein said step of displaying the alternative machine-generated text candidates further includes displaying the alternative machine-generated text candidates in the list in an order based on a confidence level that each alternative machine-generated text candidate corresponds to the electronic ink input.

9. The method according to claim 1, wherein the alternative machine-generated text candidates include machine-generated text candidates based on the electronic ink input generated by a handwriting recognition engine.

10. The method according to claim 1, further comprising displaying the machine-generated text candidates generated by the handwriting recognition engine and subsequently displaying the machine-generated text candidates generated in accordance with the statistical language model.

11. The method according to claim 10, further comprising receiving input requesting the display of the machine-generated text candidates generated in accordance with the statistical language model while displaying the machine-generated text candidates generated by the handwriting recognition engine.

12. The method according to claim 1, wherein the alternative machine-generated text candidates include text candidates based on the electronic ink input generated by a statistical language model.

13. The method according to claim 1, wherein the step of converting the speech input to the second machine-generated text includes
determining if the speech input corresponds to one of the alternative machine-generated text candidates; and
converting the speech input to the corresponding alternative machine-generated text candidate when the speech input corresponds to the alternative machine-generated text candidate.

14. The method according to claim 1, wherein further comprising the step of receiving an input confirming that the second machine-generated text candidate should replace the first machine-generated text candidate prior to performing said step of replacing.

15. A computer-readable medium including computer-executable instructions stored thereon for performing the method of claim 1.

16. A method for recognizing an input, comprising:
receiving electronic ink input;
generating a list of machine-generated objects based on the electronic ink input, the list including a first machine-generated object and alternative machine-generated objects;
converting the electronic ink input to the first machine-generated object;
displaying the first machine-generated object;
receiving speech input;
converting the speech input to a second machine-generated object, wherein converting of the speech input is performed based on the list of machine-generated objects and wherein the second machine-generated object is one of the list of machine-generated objects pursuant to a statistical language model to generate every instance of a machine-generated object functioning as a dictionary, the similarity between the dictionary and the list of machine-generated objects being represented as a function defined as the logarithmic value of a count of the matched characters divides by the value of the sum of the length of machine-generated objects and every instance of the machine-generated object functioning as the dictionary, and analyzing when the string similarity between the length of machine-generated objects and every instance of the machine-generated object functioning as the dictionary is very small, including the optimum constraint, with every instance of the machine-generated Object functioning as the dictionary being completely discounted as a candidate of the list of machine-generated objects for converting speech into text; and
replacing the first machine-generated object with the second machine-generated object when the second machine-generated object is different from the first machine-generated object.

17. The method according to claim 16, further comprising the step of receiving input confirming that the second machine-generated object should replace the first machine-generated object prior to performing said step of replacing.

18. The method according to claim 16, further comprising receiving input selecting the first machine-generated object prior to receiving the speech input.

19. The method according to claim 16, further comprising displaying a list of alternative machine-generated objects on the display prior to receiving the speech input.

20. The method according to claim 19, wherein said step of displaying the alternative machine-generated objects further includes displaying the alternative machine-generated objects in the list in an order based on a confidence level that each alternative machine-generated object corresponds to the electronic ink input.

21. The method according to claim 16, wherein the alternative machine-generated objects include objects based on the electronic ink input generated by a handwriting recognition engine.

22. The method according to claim 16, further comprising displaying the machine-generated objects generated by the handwriting recognition engine and subsequently displaying the machine-generated objects generated in accordance with the statistical language model.

23. The method according to claim 22, receiving input requesting the display of the machine-generated objects generated in accordance wit the statistical language model while displaying the machine-generated objects generated by the handwriting recognition engine.

24. The method according to claim 16, wherein the alternative machine-generated objects include machine-generated objects based on the electronic ink input generated by a statistical language model.

25. The method according to claim 16, wherein the step of converting the speech input to the second machine-generated object includes
determining if the speech input corresponds to one of the alternative machine-generated objects; and
converting the speech input to the corresponding alternative machine-generated object when the speech input corresponds to the alternative machine-generated object.

26. A computer-readable medium including computer-executable instructions stored thereon for performing the method of claim 16.

27. A system comprising:
a display;
a first input adapted to receive electronic ink input;
a second input adapted to receive speech input; and
a processor programmed and adapted to: (a) convert the electronic ink input to first machine-generated text using handwriting recognition; (b) display the first machine-generated text on the display; (c) convert the speech input to second machine-generated text using speech recognition; (d) generate a list of machine-generated text candidates based on the electronic ink input, the list including a first machine-generated text candidate and alternative machine-generated text candidates and pursuant to a statistical language model to generate every instance of an alternative machine-generated text candidates functioning as a dictionary, the similarity between the dictionary and the list of alternative machine-generated text candidates being represented as a function defined as the logarithmic value of a count of the matched characters divides by the value of the sum of the length of alternative machine-generated text candidates and every instance of the alternative machine-generated text candidate functioning as the dictionary, and analyzing when the string similarity between the length of alternative machine-generated text candidates and every instance of the alternative machine-generated text candidate functioning as the dictionary very small, including the optimum constraint, with every instance of the alternative machine-generated text candidate functioning as the dictionary being completely discounted as a candidate of the list of alternative machine-generated text candidates for converting speech into text and functioning as a dictionary for converting the speech input; and (e) replace the first machine-generated text candidate with the second machine-generated text.

28. The system according to claim 27, wherein the first machine-generated text is a word.

29. The system according to claim 27, wherein one of the first or second inputs is adapted to receive a confirmation input that the second machine-generated text is correct before replacing the first machine-generated text with the second machine-generated text.

30. The system according to claim 27, wherein the first input is further adapted to receive a selection of a portion of the first machine-generated text for correction.

31. The system according to claim 30, wherein the selected portion is the entire first machine-generated text.

32. The system according to claim 27, wherein said processor is further programmed to display the alternative machine-generated text candidates on the display prior to the second input receiving the speech input.

33. The system according to claim 27, wherein said processor is further programmed to display the alternative machine-generated text candidates on the display in an order in the list based on a confidence level that the respective alternative machine-generated text candidate corresponds to the electronic ink input.

34. The system according to claim 27, wherein said processor is programmed to generate the alternative machine-generated text candidates based on the electronic ink input using a handwriting recognition engine.

35. The system according to claim 27, wherein the first input is further adapted to receive a request to display the machine-generated text candidates generated in accordance with the statistical language model while displaying the machine-generated text candidates generated by the handwriting recognition engine.

36. The system according to claim 27, wherein said processor is programmed to generate the alternative machine-generated text candidates based on the electronic ink input using a statistical language model.

37. The system according to claim 27, wherein said processor is further programmed to determine if the speech input corresponds to one of the alternative machine-generated text candidates; and convert the speech input to the corresponding alternative machine-generated text candidate when the speech input corresponds to the alternative machine-generated text candidate.

38. A system for recognizing an input, comprising:
a display;
a first input adapted to receive an electronic ink input;
a second input adapted to receive speech input; and
a processor programmed and adapted to: (a) convert the electronic ink input to a first machine-generated object using handwriting recognition; (b) display the first machine-generated object on the display; (c) generate a list of machine-generated objects based on the electronic ink input, the list including the first machine-generated object and alternative machine-generated objects pursuant to a statistical language model to generate every instance of an alternative machine-generated objects functioning as a dictionary, the similarity between the dictionary and the list of alternative machine-generated objects being represented as a function defined as the logarithmic value of a count of the matched characters divides by the value of the sum of the length of alternative machine-generated objects and every instance of the alternative machine-generated object functioning as the dictionary, and analyzing when the string similarity between the length of alternative machine-generated objects and every instance of the alternative machine-generated object functioning as the dictionary is very small, including the optimum constraint, with every instance of the alternative machine-generated object functioning as the dictionary being completely discounted as a candidate of the list of alternative machine-generated objects for converting speech into text and; (d) convert the speech input to a second machine-generated object using speech recognition, wherein the conversion of the speech input is performed based on the list of machine-generated objects and wherein the second machine-generated object is one of the list of machine-generated objects; and (e) replace the first machine-generated object with the second machine-generated object when the second machine-generated object is different from the first machine-generated object.

39. The system according to claim 38, wherein one of the first or second inputs is adapted to receive a confirmation input that the second machine-generated object is correct before replacing the first machine-generated object with the second machine-generated object.

40. The system according to claim 38, wherein said processor is further programmed to display the alternative machine-generated objects on the display prior to the second input receiving the speech input.

41. The system according to claim 38, wherein said processor is programmed to generate the alternative machine-generated objects based on the electronic ink input using a handwriting recognition engine.

42. The system according to claim 41, wherein said processor is programmed to generate the alternative machine-generated objects based on the electronic ink input using a statistical language model.

43. The system according to claim 42, wherein the first input is further adapted to receive a request to display the machine-generated objects generated in accordance with the statistical language model while displaying the machine-generated objects generated by the handwriting recognition engine.

44. The system according to claim 41, wherein said processor is further programmed to determine if the speech input corresponds to one of the alternative machine-generated objects; and convert the speech input to the corresponding alternative machine-generated object when the speech input corresponds to the alternative machine-generated object.

45. The method of claim 1, wherein the speech input operates pursuant to a statistical language model, to generate for every instance of a spoken word $d_k$ in the dictionary, the similarity between $d_k$ and list of machine-generated text candidates $w_{i,j}$ is defined as $$s_{sim}(d_k, w_{i,j}) = \log\left(\frac{c_{match}(w_{i,j}, d_k)}{len(w_{i,j}) + len(d_k)}\right)$$

with a $C_{match}(w_{i,j}, d_k)$ being the count of the matched characters between $d_k$ and $w_{i,j}$ (considering order), the $len(w_{i,j})$ is the character count of word $w_{i,j}$, and the $len(d_k)$ is the character count of word $d_k$, where the statistical score of $d_k$ in string similarity is defined as $$s_{sim}(d_k) = \max(s_{sim}(d_k, w_{i,j}))$$

analyzing when the string similarity between $d_k$ and $w_{i,j}$ is very small, including the optimum constraint, with $d_k$ being completely discounted as a candidate of $w_i$ for converting the speech into text; and replacing the first machine-generated text candidate with the second machine-generated text.

46. The method of claim 16, wherein the speech input operates pursuant to a statistical language model, to generate for every instance of a spoken word $d_k$ in the dictionary, the similarity between $d_k$ and list of machine-generated text candidates $w_{i,j}$ is defined as $$s_{sim}(d_k, w_{i,j}) = \log\left(\frac{c_{match}(w_{i,j}, d_k)}{len(w_{i,j}) + len(d_k)}\right)$$

with a $c_{match}(w_{i,j}, d_k)$ being the count of the matched characters between $d_k$ and $w_{i,j}$ (considering order), the $len(w_{i,j})$ is the character count of word $w_{i,j}$, and the $len(d_k)$ is the character count of word $d_k$, where the statistical score of $d_k$ in string similarity is defined as $$s_{sim}(d_k) = \text{Max}(s_{sim}(d_k, w_{i,j}))$$

analyzing when the string similarity between $d_k$ and $w_{i,j}$ is very small, including the optimum constraint, with 4 being completely discounted as a candidate of $w_i$ for converting the speech into text; and replacing the first machine-generated text candidate with the second machine-generated text.

47. The method of claim 27, wherein the speech input operates pursuant to a statistical language model, to generate for every instance of a spoken word $d_k$ in the dictionary, the similarity between $d_k$ and list of machine-generated text candidates $w_{i,j}$ is defined as $$s_{sim}(d_k, w_{i,j}) = \log\left(\frac{c_{match}(w_{i,j}, d_k)}{len(w_{i,j}) + len(d_k)}\right)$$

with a $c_{match}(w_{i,j}, d_k)$ being the count of the matched characters between $d_k$ and $w_{i,j}$ (considering order), the $len(w_{i,j})$ is the character count of word $w_{i,j}$, and the $len(d_k)$ is the character count of word $d_k$, where the statistical score of $d_k$ in string similarity is defined as $$s_{sim}(d_k) = \max(s_{sim}(d_k, w_{i,j}))$$

analyzing when the string similarity between $d_k$ and $w_{i,j}$ is very small, including the optimum constraint, with $d_k$ being completely discounted as a candidate of $w_i$ for converting the speech into text; and replacing the first machine-generated text candidate with the second machine-generated text.

48. The method of claim 38, wherein the speech input operates pursuant to a statistical language model, to generate for every instance of a spoken word $d_k$ in the dictionary, the similarity between $d_k$ and list of machine-generated text candidates $w_{i,j}$ is defined as $$s_{sim}(d_k, w_{i,j}) = \log\left(\frac{c_{match}(w_{i,j}, d_k)}{len(w_{i,j}) + len(d_k)}\right)$$

with a $c_{match}(w_{i,j}, d_k)$ being the count of the matched characters between $d_k$ and $w_{i,j}$ (considering order), the $len(w_{i,j})$ is the character count of word $w_{i,j}$, and the $len(d_k)$ is the character count of word $d_k$, where the statistical score of $d_k$ in string similarity is defined as $$s_{sim}(d_k) = \max(s_{sim}(d_k, w_{i,j}))$$

analyzing when the string similarity between $d_k$ and $w_{i,j}$ is very small, including the optimum constraint, with $d_k$ being completely discounted as a candidate of $w_i$ for converting the speech into text; and replacing the first machine-generated text candidate with the second machine-generated text.

* * * * *

UNITED STATES PATENT AND TRADEMARK OFFICE
CERTIFICATE OF CORRECTION

| | | |
|---|---|---|
| PATENT NO. | : 7,506,271 B2 | Page 1 of 1 |
| APPLICATION NO. | : 10/734305 | |
| DATED | : March 17, 2009 | |
| INVENTOR(S) | : Jian Wang et al. | |

It is certified that error appears in the above-identified patent and that said Letters Patent is hereby corrected as shown below:

In column 16, line 7, in Claim 1, delete "afunction" and insert -- a function --, therefor.

In column 17, line 37, in Claim 16, delete "Object" and insert -- object --, therefor.

In column 18, line 5, in Claim 23, delete "wit" and insert -- with --, therefor.

In column 18, line 52, in Claim 27, after "dictionary" insert -- is --.

In column 20, line 54, in Claim 45, delete " $C_{match}(w_{i,j}, d_k)$ " and insert -- $c_{match}(w_{i,j}, d_k)$ --, therefor.

In column 21, line 17, in Claim 46, delete " $s_{sim}(d_k) = Max(s_{sim}(d_k, w_{i,j}))$ " and insert -- $s_{sim}(d_k) = \max(s_{sim}(d_k, w_{i,j}))$ --, therefor.

In column 21, line 19, in Claim 46, delete "4" and insert -- $d_k$ --, therefor.

In column 22, line 1, in Claim 47, delete "$w_{i,j}$," and insert -- $w_{i,j}$, --, therefor.

In column 22, line 25, in Claim 48, delete "len($d_k$)is" and insert -- len($d_k$) is --, therefor.

In column 22, line 29, in Claim 48, delete "$d_k$and" and insert -- $d_k$ and --, therefor.

Signed and Sealed this

Seventeenth Day of May, 2011

David J. Kappos
*Director of the United States Patent and Trademark Office*